United States Patent
Kou (10) Patent No.: US 10,936,833 B2
(45) Date of Patent: Mar. 2, 2021

(54) NFC CONFIGURATION METHOD, MOBILE TERMINAL, AND COMPUTER-READABLE STORAGE MEDIUM

(71) Applicant: ZTE CORPORATION, Guangdong (CN)

(72) Inventor: Lei Kou, Guangdong (CN)

(73) Assignee: ZTE CORPORATION, Guangdong (CN)

(*) Notice: Subject to any disclaimer, the term of this patent is extended or adjusted under 35 U.S.C. 154(b) by 0 days.

(21) Appl. No.: 16/755,418

(22) PCT Filed: Aug. 21, 2018

(86) PCT No.: PCT/CN2018/101572
§ 371 (c)(1),
(2) Date: Apr. 10, 2020

(87) PCT Pub. No.: WO2019/072025
PCT Pub. Date: Apr. 18, 2019

(65) Prior Publication Data
US 2020/0242310 A1    Jul. 30, 2020

(30) Foreign Application Priority Data
Oct. 13, 2017    (CN) .......................... 201710953725.6

(51) Int. Cl.
*G06K 7/10* (2006.01)
*G06K 19/07* (2006.01)

(52) U.S. Cl.
CPC ..... *G06K 7/10297* (2013.01); *G06K 19/0723* (2013.01)

(58) Field of Classification Search
CPC .......... G06K 7/10297; G06K 7/10237; G06K 7/10198; G06K 19/0723; H04W 4/50;
(Continued)

(56) References Cited

U.S. PATENT DOCUMENTS

| 2013/0344805 A1 | 12/2013 | Lefley |
| 2018/0027409 A1* | 1/2018 | Khanna .................. H04W 4/50 455/41.2 |

FOREIGN PATENT DOCUMENTS

| CN | 102142868 A | 8/2011 |
| CN | 103079182 A | 5/2013 |

(Continued)

OTHER PUBLICATIONS

International Search Report for the International Patent Application No. PCT/CN2018/101572, dated Nov. 15, 2018, 4 pages.

*Primary Examiner* — Laura A Gudorf
(74) *Attorney, Agent, or Firm* — Kacvinsky Daisak Bluni PLLC (57) ABSTRACT

Provided are an NFC configuration method, a mobile terminal and a computer-readable storage medium. The method includes following steps: when a preset NFC module is configured as an NFC card, current position information of the mobile terminal is acquired, and a static parameter in all of operating parameters of the NFC module is set as a first preset value corresponding to the current position information; when the NFC card is read by a card reader within a geographic range corresponding to the current position information, dynamic parameters in all of the operating parameters of the NFC module are set as multiple second preset values corresponding to the current position information in turn, where the multiple second preset values are ordered according to a preset sequence.

20 Claims, 5 Drawing Sheets

---

When a preset NFC module is configured as an NFC card, acquire current position information of the mobile terminal, and set a static parameter in all of operating parameters of the NFC module as a first preset value corresponding to the current position information in turn — S101

When the NFC card is read by a card reader within a geographic range corresponding to the current position information, set dynamic parameters in all of the operating parameters of the NFC module as multiple second preset values corresponding to the current position information — S102

(58) Field of Classification Search
CPC ..... H04W 4/029; H04W 4/02; H04W 5/0056; H04B 5/00
See application file for complete search history.

(56) References Cited

FOREIGN PATENT DOCUMENTS

| CN | 104753569 A | 7/2015 |
| CN | 105825158 A | 8/2016 |
| CN | 108205637 A | 6/2018 |

\* cited by examiner

FIG. 5

NFC CONFIGURATION METHOD, MOBILE TERMINAL, AND COMPUTER-READABLE STORAGE MEDIUM

CROSS-REFERENCE TO RELATED APPLICATIONS

This is a National Stage Application, filed under 35 U.S.C. 371, of International Patent Application No. PCT/CN2018/101572, filed on Aug. 21, 2018, which claims priority to Chinese patent application No. 201710953725.6 filed on Oct. 13, 2017, contents of both of which are incorporated herein by reference in their entireties.

TECHNICAL FIELD

The present disclosure relates to the technical field of communications and, in particular, to a near field communication (NFC) configuration method, a mobile terminal, and a computer-readable storage medium.

BACKGROUND

At present, many terminals support an NFC function. The NFC includes three operating modes, peer to peer (P2P), a card reader and a card simulation. Among them, the card simulation mode has the most commercial value. The card simulation mode is to simulate an NFC module in the terminal into an NFC card, which may be an identification NFC card, a bank NFC card, a bus and subway NFC card, and even a member NFC card, a discount NFC card, etc. With the terminal preset with the NFC module, various cards in a wallet may be simulated by the NFC module. Although the card simulation brings great convenience to the life of people, the card simulation is also the most problematic and most complicated function among the three modes of the NFC. However, various parameters formed by simulating the NFC module preset in the terminal into the NFC card are not matched with various types of card swiping devices, so that normal card swiping may not be performed.

SUMMARY

The present disclosure provides an NFC configuration method, a mobile terminal and a computer-readable storage medium to overcome a defect that normal card swiping may not be performed caused by a mismatch between various parameters formed by simulating an NFC module into an NFC card and card swiping devices in the related art.

A technical scheme adopted by the present disclosure is to provide an NFC configuration method, which is applied to a mobile terminal. The NFC configuration method includes steps described below.

When a preset NFC module is configured as an NFC card, current position information of the mobile terminal is acquired, and a static parameter in all of operating parameters of the NFC module is set as a first preset value corresponding to the current position information.

When the NFC card is read by a card reader within a geographic range corresponding to the current position information, dynamic parameters in all of the operating parameters of the NFC module are set as multiple second preset values corresponding to the current position information in turn, where the multiple second preset values are ordered according to a preset sequence.

According to an exemplary embodiment, a determination manner of the static parameter includes steps described below.

When the NFC card is read by the card reader, each of the operating parameters of the NFC module is adjusted within a preset parameter value range.

Under the condition that the number of times of reading the NFC card by the card reader is greater than a first set threshold, a first operating parameter with the number of times of adjustment less than a second set threshold is determined in all of the operating parameters of the NFC module.

The first operating parameter is set as the static parameter.

According to an exemplary embodiment, a determination manner of the first preset value includes a step described below.

Under the condition that the first operating parameter is set as the static parameter, a parameter value, which has the largest number of times of reading and corresponds to the first operating parameter, is set as the first preset value.

According to an exemplary embodiment, the step in which when the NFC card is read by the card reader within the geographic range corresponding to the current position information, the dynamic parameters in all of the operating parameters of the NFC module are set as the multiple second preset values corresponding to the current position information in turn includes steps described below.

When the NFC card is read by the card reader, current time and the multiple second preset values corresponding to the current position information are acquired.

Third preset values corresponding to the current time is determined within a range of the multiple second preset values according to a mapping relation between a preset time interval and the multiple second preset values.

The dynamic parameters in all of the operating parameters of the NFC module are set as the third preset values in turn, where the third preset values are ordered according to a sequence of the multiple second preset values.

According to an exemplary embodiment, a determination manner of the dynamic parameters includes steps described below.

When the NFC card is read by the card reader, each of the operating parameters of the NFC module is adjusted within a preset parameter value range.

Under the condition that the number of times of reading the NFC card by the card reader is greater than a first set threshold, second operating parameters with the number of times of adjustment greater than or equal to a second set threshold are determined in all of the operating parameters of the NFC module.

The second operating parameters are set as the dynamic parameters.

According to an exemplary embodiment, a determination manner of the second preset values includes steps described below.

Under the condition that the second operating parameters are set as the dynamic parameters, a parameter value corresponding to a second operating parameter is set as one of the second preset values in response to reading the NFC card by the card reader each time.

All the second preset values are ordered in a descending sequence according to the number of times of setting each of the second preset values.

According to an exemplary embodiment, the step in which the dynamic parameters in all of the operating parameters of the NFC module are set as the multiple second preset values corresponding to the current position information in turn includes steps described below.

Under the condition that a shutdown instruction is received, a dynamic parameter is set as a fourth preset value, where the fourth preset value is a first preset value in the order of all the second preset values.

The present disclosure further provides a mobile terminal. The mobile terminal includes a processor, a memory and an NFC module.

The processor is configured to execute an NFC configuration program stored in the memory to implement operations described below.

When a preset NFC module is configured as an NFC card, current position information of the mobile terminal is acquired, and a static parameter in all of operating parameters of the NFC module is set as a first preset value corresponding to the current position information.

When the NFC card is read by a card reader within a geographic range corresponding to the current position information, dynamic parameters in all of the operating parameters of the NFC module are set as multiple second preset values corresponding to the current position information in turn, where the multiple second preset values are ordered according to a preset sequence.

According to an exemplary embodiment, a determination manner of the static parameter includes operations described below.

When the NFC card is read by the card reader, each of the operating parameters of the NFC module is adjusted within a preset parameter value range.

Under the condition that the number of times of reading the NFC card by the card reader is greater than a first set threshold, a first operating parameter with the number of times of adjustment less than a second set threshold is determined in all of the operating parameters of the NFC module.

The first operating parameter is set as the static parameter.

According to an exemplary embodiment, a determination manner of the first preset value includes operations described below.

Under the condition that the first operating parameter is set as the static parameter, a parameter value, which has the largest number of times of reading and corresponds to the first operating parameter, is set as the first preset value.

According to an exemplary embodiment, the operation in which when the NFC card is read by the card reader within the geographic range corresponding to the current position information, the dynamic parameters in all of the operating parameters of the NFC module are set as the multiple second preset values corresponding to the current position information in turn includes operations described below.

When the NFC card is read by the card reader, current time and the multiple second preset values corresponding to the current position information are acquired.

Third preset values corresponding to the current time is determined within a range of the multiple second preset values according to a mapping relation between a preset time interval and the multiple second preset values.

The dynamic parameters in all of the operating parameters of the NFC module are set as the third preset values in turn, where the third preset values are ordered according to a sequence of the multiple second preset values.

According to an exemplary embodiment, a determination manner of the dynamic parameters includes operations described below.

When the NFC card is read by the card reader, each of the operating parameters of the NFC module is adjusted within a preset parameter value range.

Under the condition that the number of times of reading the NFC card by the card reader is greater than a first set threshold, second operating parameters with the number of times of adjustment greater than or equal to a second set threshold are determined in all of the operating parameters of the NFC module.

The second operating parameters are set as the dynamic parameters.

According to an exemplary embodiment, a determination manner of the second preset values includes operations described below.

Under the condition that the second operating parameters are set as the dynamic parameters, a parameter value corresponding to a second operating parameter is set as one of the second preset values in response to reading the NFC card by the card reader each time.

All the second preset values are ordered in a descending sequence according to a number of times of setting each of the second preset values.

According to an exemplary embodiment, the operation in which the dynamic parameters in all of the operating parameters of the NFC module are set as the multiple second preset values corresponding to the current position information in turn includes operations described below.

Under the condition that a shutdown instruction is received, a dynamic parameter is set as a fourth preset value, where the fourth preset value is a first preset value in the order of all the second preset values.

The present disclosure further provides a computer-readable storage medium, storing one or more programs. The one or more programs are able to be executed by one or more processors to implement the steps of the NFC configuration method described above.

According to the above technical schemes, the present disclosure has at least the advantages described below.

According to the NFC configuration method, the mobile terminal and the computer-readable storage medium described in the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

DETAILED DESCRIPTION

In order to further explain the technical schemes and effects adopted by the present disclosure, the present disclosure is described in detail in conjunction with the drawings and embodiments below.

Figure 1:
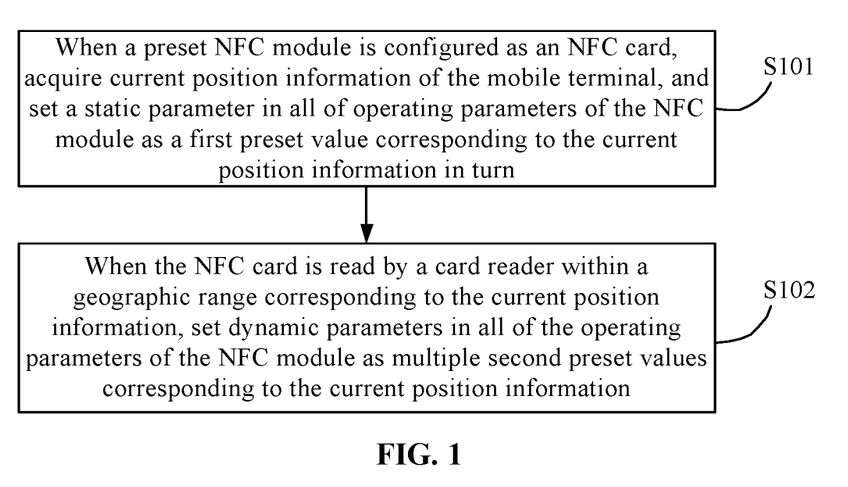
FIG. 1 is a flowchart of an NFC configuration method according to a first embodiment and a second embodiment of the present disclosure.

In a first embodiment of the present disclosure, an NFC configuration method is provided, as shown in FIG. 1. The method is applied to a mobile terminal and includes steps described below.

In step S101, when a preset NFC module is configured as an NFC card, current position information of the mobile terminal is acquired, and a static parameter in all of operating parameters of the NFC module is set as a first preset value corresponding to the current position information.

In some embodiments of the present disclosure, a manner of acquiring the current position information is not limited, which may be as follows: acquiring the current position information through a preset satellite positioning module, or acquiring the current position information according to a received communication signal from a preset communication module.

A determination manner of the static parameter in all of the operating parameters of the NFC module includes, but is not limited to, manners described below.

In manner 1, before the preset NFC module is configured as the NFC card, the NFC card configured by the NFC module is read by a set number of card readers within a geographic range corresponding to the current position information, an operating parameter with a parameter value not changing is determined in all of the operating parameters of the NFC module, and the operating parameter with the parameter value not changing is set as the static parameter.

Alternatively, in manner 2, before the preset NFC module is configured as the NFC card, the NFC card configured by the NFC module is read by the set number of card readers within the geographic range corresponding to the current position information, an operating parameter with the number of times of changing in the parameter value less than a set number is determined in all of the operating parameters of the NFC module, and the operating parameter with the number of times of changing in the parameter value less than the set number is set as the static parameter.

For example, for manner 2, before the preset NFC module is configured as the NFC card, the NFC card configured by the NFC module is read by the set number of card readers within the geographic range corresponding to the current position information, an operating parameter with the number of times of changing in the parameter value less than the set number of 2 is determined in all of the operating parameters of the NFC module, and the operating parameter with the number of times of changing in the parameter value less than the set number of 2 is set as the static parameter.

A determination manner of the first preset value includes, but is not limited to, manners described below.

In manner 1, under the condition that the NFC card configured by the NFC module is read by the set number of card readers within the geographic range corresponding to the current position information, the operating parameter with the parameter value not changing is determined in all of the operating parameters of the NFC module, and the operating parameter with the parameter value not changing is set as the static parameter, the parameter value is set as the first preset value.

Alternatively, in manner 2, under the condition that the NFC card configured by the NFC module is read by the set number of card readers within the geographic range corresponding to the current position information, the operating parameter with the number of times of changing in the parameter value less than the set number is determined in all of the operating parameters of the NFC module, and the operating parameter with the number of times of changing in the parameter value less than the set number is set as the static parameter, a parameter value, which has the largest number of times of reading and corresponds to the static parameter, is set as the first preset value.

The number of the static parameters is one or more.

Under the condition that the number of the static parameters is multiple, the first preset value is a set of parameter values corresponding to the multiple static parameters.

In step S102, when the NFC card is read by the card reader within the geographic range corresponding to the current position information, dynamic parameters in all of the operating parameters of the NFC module are set as multiple second preset values corresponding to the current position information in turn, where the multiple second preset values are ordered according to a preset sequence.

In some embodiments of the present disclosure, the geographic range corresponding to the current position information is limited, which may be a geographic range set by a user, a default geographic range when the mobile terminal is at a factory, a geographic range acquired through a limited number of experiments, or a geographic range acquired through a limited number of computer simulations.

A determination manner of the dynamic parameters in all of the operating parameters of the NFC module includes, but is not limited to, manners described below.

In manner 1, before the preset NFC module is configured as the NFC card, the NFC card configured by the NFC module is read by the set number of card readers within the geographic range corresponding to the current position information, operating parameters with the parameter value changing are determined in all of the operating parameters of the NFC module, and the operating parameters with the parameter value changing are set as the dynamic parameters.

Alternatively, in manner 2, before the preset NFC module is configured as the NFC card, the NFC card configured by the NFC module is read by the set number of card readers within the geographic range corresponding to the current position information, operating parameters with the number of times of changing in the parameter value greater than or equal to the set number are determined in all of the operating parameters of the NFC module, and the operating parameters with the number of times of changing in the parameter value greater than or equal to the set number are set as the dynamic parameters.

For example, for manner 2, before the preset NFC module is configured as the NFC card, the NFC card configured by the NFC module is read by the set number of card readers within the geographic range corresponding to the current position information, operating parameters with the number of times of changing in the parameter value greater than or equal to the set number of 2 are determined in all of the operating parameters of the NFC module, and the operating parameters with the number of times of changing in the parameter value greater than or equal to the set number of 2 are set as the dynamic parameters.

A determination manner of the second preset values includes, but is not limited to, manners described below.

In manner 1, under the condition that the NFC card configured by the NFC module is read by the set number of card readers within the geographic range corresponding to the current position information, the operating parameters with the parameter value changing are determined in all of the operating parameters of the NFC module, and the operating parameters with the parameter value changing are set as the dynamic parameters, all parameter values corresponding to the dynamic parameters are set as the second preset values.

Alternatively, in manner 2, under the condition that the NFC card configured by the NFC module is read by the set number of card readers within the geographic range corresponding to the current position information, the operating parameters with the number of times of changing in the parameter value greater than or equal to the set number are determined in all of the operating parameters of the NFC module, and the operating parameters with the number of times of changing in the parameter value greater than or equal to the set number are set as the dynamic parameters, all parameter values corresponding to the dynamic parameters are set as the second preset values.

The number of the dynamic parameters is one or more.

Under the condition that the number of the dynamic parameter is multiple, the second preset values are a set of parameter values corresponding to the multiple dynamic parameters.

A manner in which the second preset values are ordered according to the preset sequence includes, but is not limited to, a step described below.

The second preset values are ordered in a descending sequence according to the number of times of reading each of the second preset values by the set number of card readers within the geographic range corresponding to the current position information.

According to the NFC configuration method described in the first embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

In a second embodiment of the present disclosure, an NFC configuration method is provided, as shown in FIG. 1. The method is applied to a mobile terminal and includes steps described below.

In step S101, when a preset NFC module is configured as an NFC card, current position information of the mobile terminal is acquired, and a static parameter in all of operating parameters of the NFC module is set as a first preset value corresponding to the current position information.

In some embodiments of the present disclosure, a manner of acquiring the current position information is not limited, which may be as follows: acquiring the current position information through a preset satellite positioning module, or acquiring the current position information according to a received communication signal from a preset communication module.

All of the operating parameters of the NFC module include, but are not limited to, operating parameters such as a parameter related to a radio frequency of an NFC antenna, a parameter related to a single wire protocol (SWP), and a parameter related to a chip.

A determination manner of the static parameter in all of the operating parameters of the NFC module includes, but is not limited to, steps described below.

When the NFC card configured by the NFC module is read by a card reader within a geographic range corresponding to the current position information, each of the operating parameters of the NFC module is adjusted within a preset parameter value range.

Under the condition that the number of times of reading the NFC card by the card reader is greater than a first set threshold, a first operating parameter with the number of times of adjustment less than a second set threshold is determined in all of the operating parameters of the NFC module.

The first operating parameter is set as the static parameter.

In some embodiments of the present disclosure, the first set threshold is not limited, which may be the number of times of reading set by a user, a default number of times of reading when the mobile terminal is at a factory, the number of times of reading acquired through a limited number of experiments, or the number of times of reading acquired through a limited number of computer simulations.

In some embodiments of the present disclosure, the second set threshold is not limited, which may be the number of times of adjustment set by a user, a default number of times of adjustment when the mobile terminal is at a factory, the number of times of adjustment acquired through a limited number of experiments, or the number of times of adjustment acquired through a limited number of computer simulations.

In some embodiments of the present disclosure, the preset parameter value range of each of the operating parameters is set according to a parameter of an NFC chip in the NFC module.

For example, when the NFC card configured by the NFC module is read by the card reader within the geographic range corresponding to the current position information, each of the operating parameters of the NFC module is adjusted within the preset parameter value range; under the condition that the number of times of reading the NFC card by the card reader is greater than the first set threshold of 20, a first operating parameter with the number of adjustment less than the second set threshold of 1 is determined in all of the operating parameters of the NFC module; the first operating parameter is set as the static parameter.

As another example, when the NFC card configured by the NFC module is read by the card reader within the geographic range corresponding to the current position information, each of the operating parameters of the NFC module is adjusted within the preset parameter value range; under the condition that the number of times of reading the NFC card by the card reader is greater than the first set threshold of 15, a first operating parameter with the number of adjustment less than the second set threshold of 3 is determined in all of the operating parameters of the NFC module; the first operating parameter is set as the static parameter.

A determination manner of the first preset value includes, but is not limited to, a step described below.

Under the condition that the first operating parameter is set as the static parameter, a parameter value, which has the largest number of times of reading and corresponds to the first operating parameter, is set as the first preset value.

The number of the static parameter is one or more.

Under the condition that the number of the static parameter is multiple, the first preset value is a set of parameter values corresponding to the multiple static parameters.

In step S102, when the NFC card is read by the card reader within the geographic range corresponding to the current position information, dynamic parameters in all of the operating parameters of the NFC module are set as multiple second preset values corresponding to the current position information in turn, where the multiple second preset values are ordered according to a preset sequence.

In an embodiment, step S102 includes steps described below.

When the NFC card is read by the card reader, current time and multiple second preset values corresponding to the current position information are acquired.

Third preset values corresponding to the current time is determined within a range of the multiple second preset values according to a mapping relation between a preset time interval and the multiple second preset values.

The dynamic parameters in all of the operating parameters of the NFC module are set as the third preset values in turn, where the third preset values are ordered according to a sequence of the multiple second preset values.

In some embodiments of the present disclosure, the geographic range corresponding to the current position information is limited, which may be a geographic range set by a user, a default geographic range when the mobile terminal is at a factory, a geographic range acquired through a limited number of experiments, or a geographic range acquired through a limited number of computer simulations.

A determination manner of the dynamic parameters in all of the operating parameters of the NFC module includes, but is not limited to, steps described below.

When the NFC card is read by the card reader, each of the operating parameters of the NFC module is adjusted within the preset parameter value range.

Under the condition that the number of times of reading the NFC card by the card reader is greater than the first set threshold, second operating parameters with the number of times of adjustment greater than or equal to the second set threshold are determined in all of the operating parameters of the NFC module.

The second operating parameters are set as the dynamic parameters.

A determination manner of the second preset values includes, but is not limited to, steps described below.

Under the condition that the second operating parameters are set as the dynamic parameters, a parameter value corresponding to a second operating parameter is set as one of the second preset values in response to reading the NFC card by the card reader each time.

All the second preset values are ordered in a descending sequence according to the number of times of setting each of the multiple second preset values.

The number of the dynamic parameter is one or more.

Under the condition that the number of the dynamic parameter is multiple, the second preset values are a set of parameter values corresponding to the multiple dynamic parameters.

In an embodiment, the step in which the dynamic parameters in all of the operating parameters of the NFC module are set as the multiple second preset values corresponding to the current position information in turn includes steps described below.

Under the condition that a shutdown instruction is received, a dynamic parameter is set as a fourth preset value, where the fourth preset value is a first preset value in the order of all the second preset values.

According to the NFC configuration method described in the second embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

Figure 2:
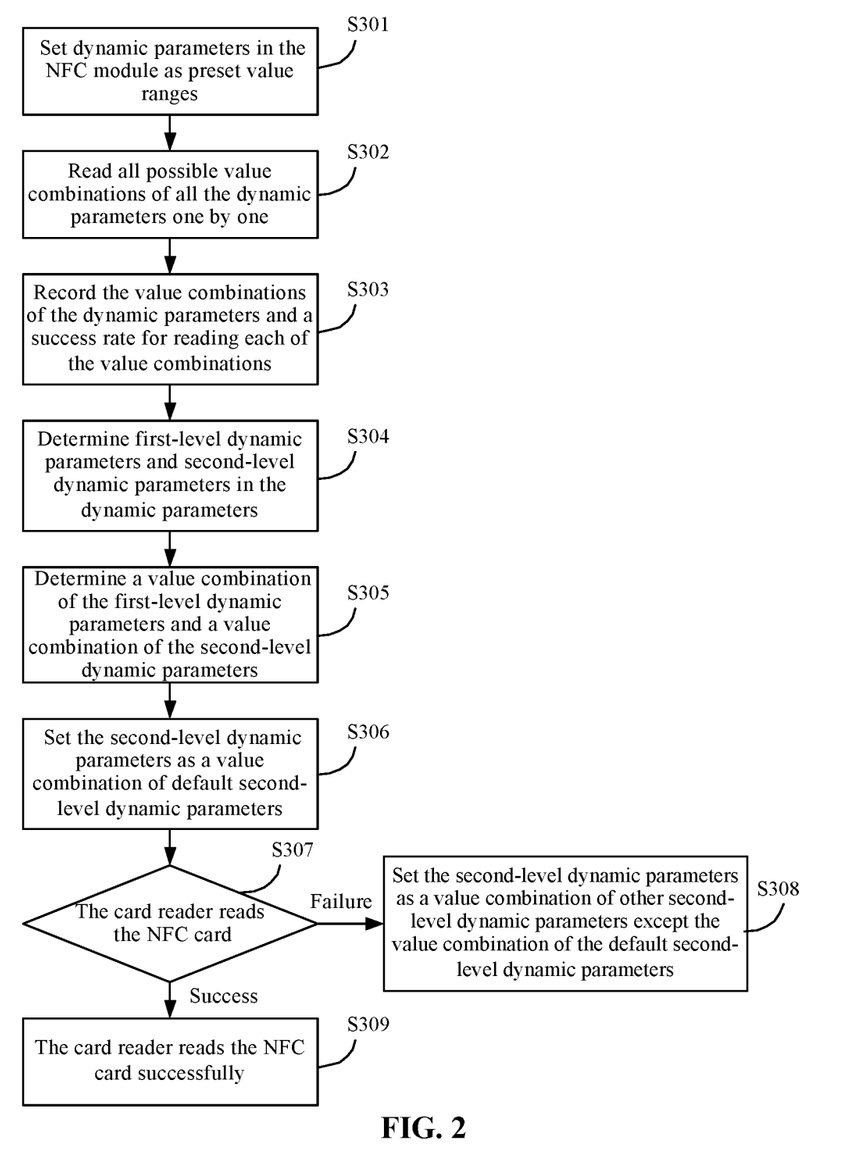
FIG. 2 is a flowchart of an NFC configuration method according to a third embodiment of the present disclosure.

In a third embodiment of the present disclosure which is based on the above embodiments, an application example of the present disclosure is described by taking an NFC configuration method as an example and with reference to FIG. 2.

In step S301, when a preset NFC module is configured as an NFC card, dynamic parameters in the NFC module are set as preset value ranges.

Before the preset NFC module is configured as the NFC card, the NFC card is read in a limited number of times by the card reader, and operating parameters that have changed in all of the operating parameters of the NFC module are set as the dynamic parameters.

The dynamic parameters include $s1$, $s2$, $s3$, $s4$, $s5$, $s6$, $s7$, $s8$, $s9$ and $s10$.

A value range corresponding to each of the dynamic parameters is set according to parameter values provided by an NFC manufacturer, where the value range of the $s1$ is $\{a1, b1, c1\}$; the value range of the $s2$ is $\{a2, b2, c2, d2\}$; the value range of the $s3$ is $\{a3, b3, c3\}$; the value range of the $s4$ is $\{a4, b4, c4\}$; the value range of the $s5$ is $\{a5, b5\}$; the value range of the $s6$ is $\{a6, b6, c6, d6\}$; the value range of the $s7$ is $\{a7, b7, c7\}$; the value range of the $s8$ is $\{a8, b8, c8\}$; the value range of the $s9$ is $\{a9, b9, c9\}$; the value range of the $s10$ is $\{a10, b10\}$.

In step S302, the NFC card is read by the set number of card readers, and if the NFC card fails to be read, all possible value combinations of all the dynamic parameters are read one by one.

Impossible value combinations of the dynamic parameters are deleted.

In step S303, if the NFC card is read by the card reader successfully, the value combinations of the dynamic parameters and a success rate for reading each of the value combinations are recorded in Table 1, and a dynamic parameter that has changed and the number of times of changing thereof are recorded in Table 2.

TABLE 1

| Value combination of the dynamic parameters | Success rate for reading the NFC card |
| --- | --- |
| a1, a2, a3 ... a10 | 80% |
| a1, b2, a3 ... a10 | 10% |
| a1, c2, b3 ... a10 | 8% |

TABLE 2

| Dynamic parameter | The number of times of changing |
| --- | --- |
| s2 | 2 |
| s3 | 1 |
| s4 | 5 |

In step S304, first-level dynamic parameters and second-level dynamic parameters are determined in the dynamic parameters according to time t1 when the dynamic parameters are configured by the NFC module and time t when the NFC card is read by the card reader.

For example, according to the time $t1=5$ seconds when the dynamic parameters are configured by the NFC module and the time $t=10$ seconds when the NFC card is read by the card reader, a result of $t/t1$ is rounded down to be used as the number of the second-level dynamic parameters, i.e., $t/t1=2$; in Table 2, a dynamic parameter with the number of times of changing being $t/t1=2$ is set as the second-level dynamic parameter, and a dynamic parameter except the second-level dynamic parameter in the dynamic parameters is set as the first-level dynamic parameter.

In step S305, a value combination of the first-level dynamic parameters and a value combination of the second-level dynamic parameters are determined according to the value combinations of the dynamic parameters and the success rate for reading each of the value combinations.

In Table 1, a value combination of dynamic parameters with a success rate of 80% for reading the NFC card is set as the value combination of the first-level dynamic parameters.

In Table 1, other value combinations except the value combination of the first-level dynamic parameters are set as the value combination of the second-level dynamic parameters.

In step S306, when the NFC card is read by the card reader, a current position is acquired through a global positioning system (GPS) positioning module, and the second-level dynamic parameters are set as a value combination of default second-level dynamic parameters.

In Table 1, a value combination of dynamic parameters corresponding to a success rate of 10% for reading the NFC card is set as the value combination of the default second-level dynamic parameters.

In step S307, it is determined whether the NFC card is read by the card reader successfully.

In step S308, when the NFC card fails to be read by the card reader, the second-level dynamic parameters are set as a value combination of other second-level dynamic parameters except the value combination of the default second-level dynamic parameters until the NFC card is read successfully.

In step S309, the NFC card is read by the card reader successfully.

In Table 1, a value combination except the value combination of the dynamic parameters corresponding to the success rate of 10% for reading the NFC card is set as the value combination of other second-level dynamic parameters.

According to the NFC configuration method described in the third embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user using simulates the NFC module into the NFC card is significantly improved.

Figure 3:
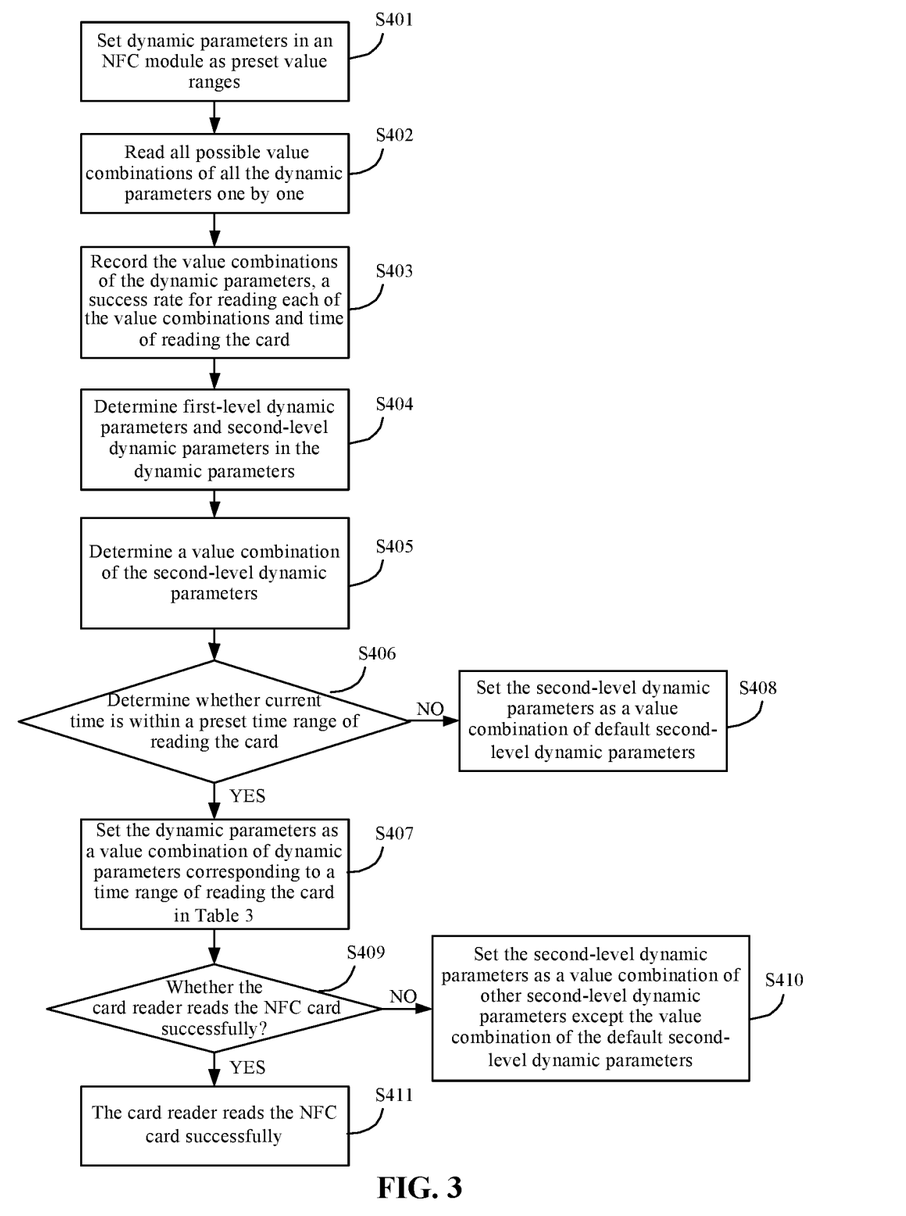
FIG. 3 is a flowchart of an NFC configuration method according to a fourth embodiment of the present disclosure.

In a fourth embodiment of the present disclosure which is based on the above embodiments, an application example of the present disclosure is described by taking an NFC configuration method as an example and with reference to FIG. 3.

In step S401, when a preset NFC module is configured as an NFC card, dynamic parameters in the NFC module are set as preset value ranges.

Before the preset NFC module is configured as the NFC card, the NFC card is read in a limited number of times by the card reader, and operating parameters that have changed in all of the operating parameters of the NFC module are set as the dynamic parameters.

The dynamic parameters include s1, s2, s3, s4, s5, s6, s7, s8, s9 and s10.

A value range corresponding to each of the dynamic parameters is set according to parameter values provided by an NFC manufacturer, where the value range of the s1 is {a1, b1, c1}; the value range of the s2 is {a2, b2, c2, d2}; the value range of the s3 is {a3, b3, c3}; the value range of the s4 is {a4, b4, c4}; the value range of the s5 is {a5, b5}; the value range of the s6 is {a6, b6, c6, d6}; the value range of the s7 is {a7, b7, c7}; the value range of the s8 is {a8, b8, c8}; the value range of the s9 is {a9, b9, c9}; the value range of the s10 is {a10, b10}.

In step S402, the NFC card is read by the set number of card readers, and if the NFC card fails to be read, all possible value combinations of all the dynamic parameters are read one by one.

Impossible value combinations of the dynamic parameters are deleted.

In step S403, if the NFC card is read by the card reader successfully, the value combinations of the dynamic parameters, a success rate for reading each of the value combinations, and time of reading the card are recorded in Table 3, and a dynamic parameter that has changed and the number of times of changing thereof are recorded in Table 4.

TABLE 3

| Value combination of the dynamic parameters | Success rate for reading the NFC card | Time of reading the card |
| --- | --- | --- |
| a1, a2, a3 . . . a10 | 80% | 08:00-09:00 |
| a1, b2, a3 . . . a10 | 10% | 12:00-13:00 |
| a1, c2, b3 . . . a10 | 8% | 15:00-14:00 |

TABLE 4

| Dynamic parameter | The number of times of changing |
| --- | --- |
| s2 | 2 |
| s3 | 1 |
| s4 | 5 |

In step S404, first-level dynamic parameters and second-level dynamic parameters are determined in the dynamic parameters according to time t1 when the dynamic parameters are configured by the NFC module and time t when the NFC card is read by the card reader.

For example, according to the time t1=5 seconds when the dynamic parameters are configured by the NFC module and the time t=10 seconds when the NFC card is read by the card reader, a result of t/t1 is rounded down to be used as the number of the second-level dynamic parameters, i.e., t/t1=2; in Table 4, a dynamic parameter with the number of times of changing being t/t1=2 is set as the second-level dynamic parameter, and a dynamic parameter except the second-level dynamic parameter in the dynamic parameters is set as the first-level dynamic parameter.

In step S405, a value combination of the second-level dynamic parameters is determined according to the value combinations of the dynamic parameters and the success rate for reading each of the value combinations.

In Table 3, a value combination of dynamic parameters with a success rate of 80% for reading the NFC card is set as a value combination of the first-level dynamic parameters.

In Table 3, other value combinations except the value combination of the first-level dynamic parameters are set as the value combinations of the second-level dynamic parameters.

In step S406, when the NFC card is read by the card reader, it is determined whether current time is within a preset time range of reading the card.

If the current time is within the preset time range of reading the card, step S407 is performed, i.e., the dynamic parameters are set as a value combination of dynamic parameters corresponding to the time range of reading the card in Table 3; otherwise, step S408 is performed.

In step S407, the dynamic parameters are set as the value combination of dynamic parameters corresponding to the time range of reading the card in Table 3.

In step S408, a current position is acquired through a GPS positioning module, and the second-level dynamic parameters are set as a value combination of default second-level dynamic parameters.

In Table 3, a value combination of dynamic parameters corresponding to a success rate of 10% for reading the NFC card is set as the value combination of the default second-level dynamic parameters.

In step S409, it is determined whether the NFC card is read by the card reader successfully.

In step S410, when the NFC card fails to be read by the card reader, the second-level dynamic parameters are set as a value combination of other second-level dynamic parameters except the value combination of the default second-level dynamic parameters until the NFC card is read successfully.

In step S411, the NFC card is read by the card reader successfully.

In Table 3, a value combinations except the value combination of the dynamic parameters corresponding to the success rate of 10% for reading the NFC card is set as the value combination of other second-level dynamic parameters.

According to the NFC configuration method described in the fourth embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

Figure 4:
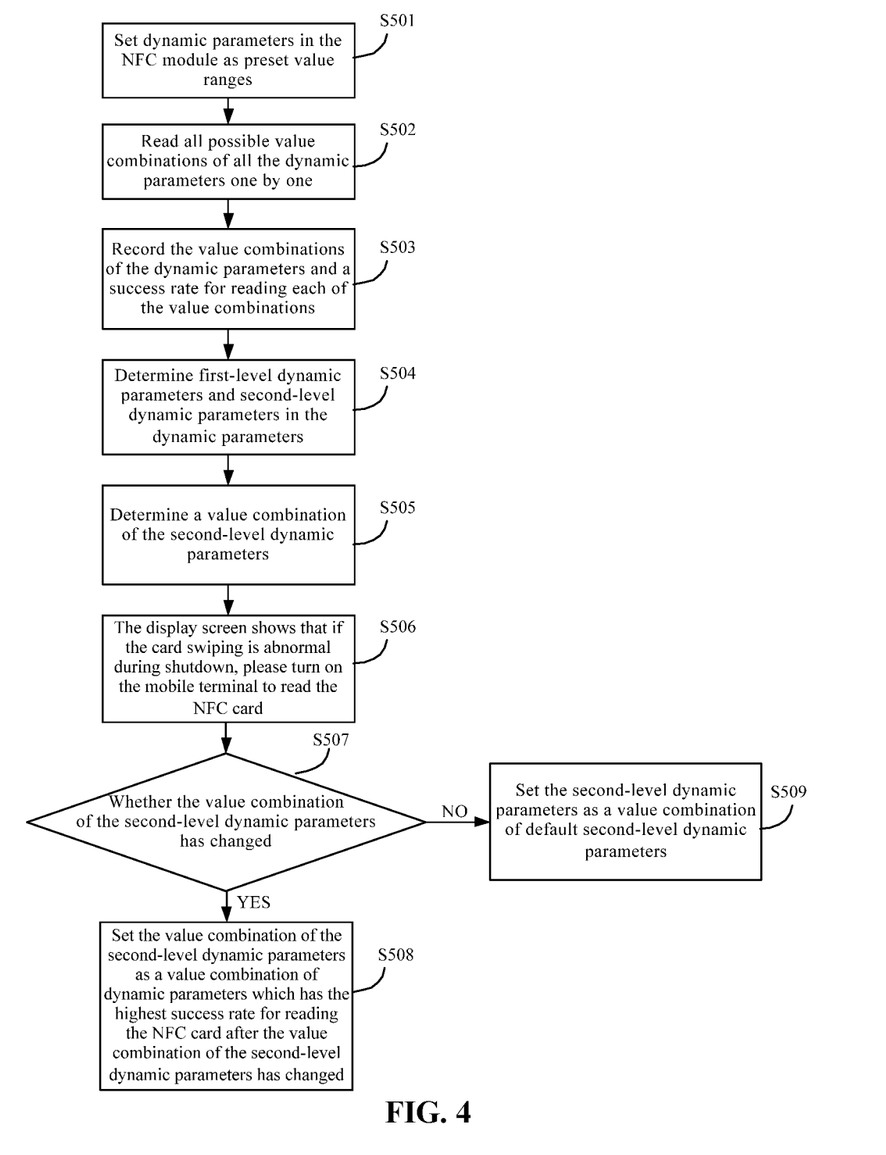
FIG. 4 is a flowchart of an NFC configuration method according to a fifth embodiment of the present disclosure.

In a fifth embodiment of the present disclosure which is based on the above embodiments, an application example of the present disclosure is described be taking an NFC configuration method is taken as an example and with reference to FIG. 4.

In step S501, when a preset NFC module is configured as an NFC card, dynamic parameters in the NFC module are set as preset value ranges.

Before the preset NFC module is configured as the NFC card, the NFC card is read in a limited number of times by the card reader, and operating parameters that have changed in all of the operating parameters of the NFC module are set as the dynamic parameters.

The dynamic parameters include s1, s2, s3, s4, s5, s6, s7, s8, s9 and s10.

A value range corresponding to each of the dynamic parameters is set according to parameter values provided by an NFC manufacturer, where the value range of the s1 is {a1, b1, c1}; the value range of the s2 is {a2, b2, c2, d2}; the value range of the s3 is {a3, b3, c3}; the value range of the s4 is {a4, b4, c4}; the value range of the s5 is {a5, b5}; the value range of the s6 is {a6, b6, c6, d6}; the value range of the s7 is {a7, b7, c7}; the value range of the s8 is {a8, b8, c8}; the value range of the s9 is {a9, b9, c9}; the value range of the s10 is {a10, b10}.

In step S502, the NFC card is read by the set number of card readers, and if the NFC card fails to be read, all possible value combinations of all the dynamic parameters are read one by one.

Impossible value combinations of the dynamic parameters are deleted.

In step S503, if the NFC card is read by the card reader successfully, the value combinations of the dynamic parameters and a success rate for reading each of the value combinations are recorded in Table 5, and a dynamic parameter that has changed and the number of times of changing thereof are recorded in Table 6.

TABLE 5

| Value combination of the dynamic parameters | Success rate for reading the NFC card |
|---|---|
| a1, a2, a3 ... a10 | 80% |
| a1, b2, a3 ... a10 | 10% |
| a1, c2, b3 ... a10 | 8% |

TABLE 6

| Dynamic parameter | The number of times of changing |
|---|---|
| s2 | 2 |
| s3 | 1 |
| s4 | 5 |

In step S504, first-level dynamic parameters and second-level dynamic parameters are determined in the dynamic parameters according to time t1 when the dynamic parameters are configured by the NFC module and time t when the NFC card is read by the card reader.

For example, according to the time t1=5 seconds when the dynamic parameters are configured by the NFC module and the time t=10 seconds when the NFC card is read by the card reader, a result of t/t1 is rounded down to be used as the number of the second-level dynamic parameters, i.e., t/t1=2; in Table 6, a dynamic parameter with the number of times of changing being t/t1=2 is set as the second-level dynamic parameter, and a dynamic parameter except the second-level dynamic parameter in the dynamic parameters is set as the first-level dynamic parameter.

In step S505, a value combination of the second-level dynamic parameters is determined according to the value combinations of the dynamic parameters and the success rate for reading each of the value combinations.

In Table 5, a value combination of dynamic parameters with a success rate of 80% for reading the NFC card is set as a value combination of the first-level dynamic parameters.

In Table 5, other value combinations except the value combination of the first-level dynamic parameters are set as the value combination of the second-level dynamic parameters.

In step S506, when a shutdown instruction is received, the display screen shows that if the card swiping is abnormal during shutdown, please turn on the mobile terminal to read the NFC card.

In step S507, it is determined whether the value combination of the second-level dynamic parameters has changed.

If the value combination of the second-level dynamic parameters has changed, step S508 is performed. Otherwise, step S509 is performed.

In step S508, the value combination of the second-level dynamic parameters is set as a value combination of dynamic parameters which has the highest success rate for reading the NFC card after the value combination of the second-level dynamic parameters has changed.

In step S509, the second-level dynamic parameters are set as the value combination of the default second-level dynamic parameters.

In Table 5, the value combination of the dynamic parameters corresponding to the success rate of 10% for reading the NFC card is set as the value combination of the default second-level dynamic parameters.

According to the NFC configuration method described in the fifth embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

Figure 5:
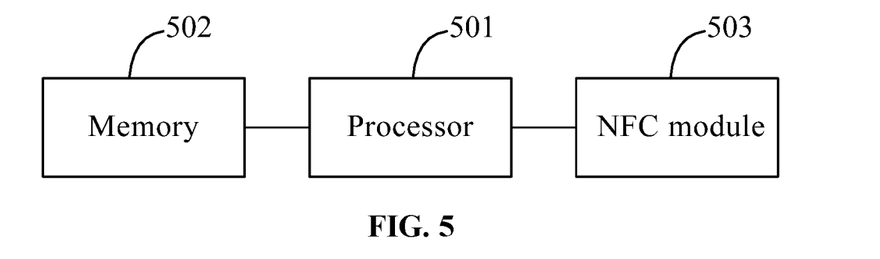
FIG. 5 is a structural diagram of composition of a mobile terminal according to a sixth embodiment and a seventh embodiment of the present disclosure.

In a sixth embodiment of the present disclosure, a mobile terminal is provided. As shown in FIG. 5, the mobile terminal includes a processor 501, a memory 502 and an NFC module 503. In some embodiments of the present disclosure, the processor 501, the memory 502 and the NFC module 503 may be connected via a bus or in other manners.

The processor 501 may be a general-purpose processor, such as a central processing unit (CPU), a digital signal processor (DSP) or an application specific integrated circuit (ASIC), or may be configured as one or more integrated circuits to implement the embodiments of the present disclosure. The memory 502 is configured to store executable instructions of the processor 501.

The memory 502 is configured to store program codes and transmit the program codes to the processor 501. The memory 502 may include a volatile memory, such as a random access memory (RAM). The memory 502 may also include a non-volatile memory, such as a read-only memory (ROM), a flash memory, a hard disk drive (HDD), or a solid-state drive (SSD). The memory 502 may further include a combination of the above types of memories.

The processor 501 is configured to call a management code of the program codes stored in the memory 502 to perform operations described below.

1) When a preset NFC module is configured as an NFC card, current position information of the mobile terminal is acquired, and a static parameter in all of operating parameters of the NFC module is set as a first preset value corresponding to the current position information.

In some embodiments of the present disclosure, a manner of acquiring the current position information is not limited, which may be as follows: acquiring the current position information through a preset satellite positioning module, or acquiring the current position information according to a received communication signal from a preset communication module.

A determination manner of the static parameter in all of the operating parameters of the NFC module includes, but is not limited to, manners described below.

In manner 1, before the preset NFC module is configured as the NFC card, the NFC card configured by the NFC module is read by a set number of card readers within a geographic range corresponding to the current position information, an operating parameter with a parameter value not changing is determined in all of the operating parameters of the NFC module, and the operating parameter with the parameter value not changing is set as the static parameter.

Alternatively, in manner 2, before the preset NFC module is configured as the NFC card, the NFC card configured by the NFC module is read by the set number of card readers within the geographic range corresponding to the current position information, an operating parameter with the number of times of changing in the parameter value less than a set number is determined in all of the operating parameters of the NFC module, and the operating parameter with the number of times of changing in the parameter value less than the set number is set as the static parameter.

For example, for manner 2, before the preset NFC module is configured as the NFC card, the NFC card configured by the NFC module is read by the set number of card readers within the geographic range corresponding to the current position information, an operating parameter with the number of times of changing in the parameter value less than the set number of 2 is determined in all of the operating parameters of the NFC module, and the operating parameter with the number of times of changing in the parameter value less than the set number of 2 is set as the static parameter.

A determination manner of the first preset value includes, but is not limited to, manners described below.

In manner 1, under the condition that the NFC card configured by the NFC module is read by the set number of card readers within the geographic range corresponding to the current position information, the operating parameter with the parameter value not changing is determined in all of the operating parameters of the NFC module, and the operating parameter with the parameter value not changing is set as the static parameter, the parameter value is set as the first preset value.

Alternatively, in manner 2, under the condition that the NFC card configured by the NFC module is read by the set number of card readers within the geographic range corresponding to the current position information, the operating parameter with the number of times of changing in the parameter value less than the set number is determined in all of the operating parameters of the NFC module, and the operating parameter with the number of times of changing in the parameter value less than the set number is set as the static parameter, a parameter value, which has the largest number of times of reading and corresponds to the static parameter, is set as the first preset value.

The number of the static parameters is one or more.

Under the condition that the number of the static parameters is multiple, the first preset value is a set of parameter values corresponding to the multiple static parameters.

2) When the NFC card is read by the card reader within the geographic range corresponding to the current position information, dynamic parameters in all of the operating parameters of the NFC module are set as multiple second preset values corresponding to the current position information in turn, where the multiple second preset values are ordered according to a preset sequence.

In some embodiments of the present disclosure, the geographic range corresponding to the current position information is limited, which may be a geographic range set by a user, a default geographic range when the mobile terminal is at a factory, a geographic range acquired through a limited number of experiments, or a geographic range acquired through a limited number of computer simulations.

A determination manner of the dynamic parameters in all of the operating parameters of the NFC module includes, but is not limited to, manners described below.

In manner 1, before the preset NFC module is configured as the NFC card, the NFC card configured by the NFC module is read by the set number of card readers within the geographic range corresponding to the current position information, operating parameters with the parameter value changing are determined in all of the operating parameters of the NFC module, and the operating parameter with the parameter value changing are set as the dynamic parameter.

Alternatively, in manner 2, before the preset NFC module is configured as the NFC card, the NFC card configured by the NFC module is read by the set number of card readers within the geographic range corresponding to the current position information, operating parameters with the number of times of changing in the parameter value greater than or equal to the set number are determined in all of the operating parameters of the NFC module, and the operating parameters with the number of times of changing in the parameter value greater than or equal to the set number are set as the dynamic parameters.

For example, for manner 2, before the preset NFC module is configured as the NFC card, the NFC card configured by the NFC module is read by the set number of card readers within the geographic range corresponding to the current position information, operating parameters with the number of times of changing in the parameter value greater than or equal to the set number of 2 are determined in all of the operating parameters of the NFC module, and the operating parameters with the number of times of changing in the parameter value greater than or equal to the set number of 2 are set as the dynamic parameters.

A determination manner of the second preset values includes, but is not limited to, manners described below.

In manner 1, under the condition that the NFC card configured by the NFC module is read by the set number of card readers within the geographic range corresponding to the current position information, the operating parameters with the parameter value changing are determined in all of the operating parameters of the NFC module, and the operating parameter with the parameter value changing are set as the dynamic parameters, all parameter values corresponding to the dynamic parameters are set as the second preset values.

Alternatively, in manner 2, under the condition that the NFC card configured by the NFC module is read by the set number of card readers within the geographic range corresponding to the current position information, the operating parameters with the number of times of changing in the parameter value greater than or equal to the set number are determined in all of the operating parameters of the NFC module, and the operating parameters with the number of times of changing in the parameter value greater than or equal to the set number are set as the dynamic parameters, all parameter values corresponding to the dynamic parameters are set as the second preset values.

The number of the dynamic parameters is one or more.

Under the condition that the number of the dynamic parameter is multiple, the second preset values are a set of parameter values corresponding to the multiple dynamic parameters.

A manner in which the second preset values are ordered according to the preset sequence includes, but is not limited to, a step described below.

The second preset values are ordered in a descending sequence according to the number of times of reading each of the second preset values by the set number of card readers within the geographic range corresponding to the current position information.

According to the mobile terminal described in the sixth embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

In a seventh embodiment of the present disclosure, a mobile terminal is provided. As shown in FIG. 5, the mobile terminal includes a processor 501, a memory 502 and an NFC module 503. In some embodiments of the present disclosure, the processor 501, the memory 502 and the NFC module 503 may be connected via a bus or in other manners.

The processor 501 may be a general-purpose processor, such as a CPU, a DSP, or an ASIC, or may be configured as one or more integrated circuits to implement the embodiments of the present disclosure. The memory 502 is configured to store executable instructions of the processor 501.

The memory 502 is configured to store program codes and transmit the program codes to the processor 501. The memory 502 may include a volatile memory, such as a RAM. The memory 502 may also include a non-volatile memory, such as a ROM, a flash memory, an HDD, or an SSD. The memory 502 may further include a combination of the above types of memories.

The processor 501 is configured to call a management code of the program codes stored in the memory 502 to perform operations described below.

1) When a preset NFC module is configured as an NFC card, current position information of the mobile terminal is acquired, and a static parameter in all of operating parameters of the NFC module is set as a first preset value corresponding to the current position information.

In some embodiments of the present disclosure, a manner of acquiring the current position information is not limited, which may be as follows: acquiring the current position information through a preset satellite positioning module, or acquiring the current position information according to a received communication signal from a preset communication module.

All of the operating parameters of the NFC module include, but are not limited to, operating parameters such as a parameter related to a radio frequency of an NFC antenna, a parameter related to an SWP, and a parameter related to a chip.

A determination manner of the static parameter in all of the operating parameters of the NFC module includes, but is not limited to, steps described below.

When the NFC card configured by the NFC module is read by a card reader within a geographic range corresponding to the current position information, each of the operating parameters of the NFC module is adjusted within a preset parameter value range.

Under the condition that the number of times of reading the NFC card by the card reader is greater than a first set threshold, a first operating parameter with the number of times of adjustment less than a second set threshold is determined in all of the operating parameters of the NFC module.

The first operating parameter is set as the static parameter.

In some embodiments of the present disclosure, the first set threshold is not limited, which may be the number of times of reading set by a user, a default number of times of reading when the mobile terminal is at a factory, the number of times of reading acquired through a limited number of experiments, or the number of times of reading acquired through a limited number of computer simulations.

In some embodiments of the present disclosure, the second set threshold is not limited, which may be the number of times of adjustment set by a user, a default number of times of adjustment when the mobile terminal is at a factory, the number of times of adjustment acquired through a limited number of experiments, or the number of times of adjustment acquired through a limited number of computer simulations.

In some embodiments of the present disclosure, the preset parameter value range of each of the operating parameter is set according to a parameter of an NFC chip in the NFC module.

For example, when the NFC card configured by the NFC module is read by the card reader within the geographic range corresponding to the current position information, each of the operating parameters of the NFC module is adjusted within the preset parameter value range; under the condition that the number of times of reading the NFC card by the card reader is greater than the first set threshold of 20, a first operating parameter with the number of adjustment less than the second set threshold of 1 is determined in all of the operating parameters of the NFC module; the first operating parameter is set as the static parameter.

As another example, when the NFC card configured by the NFC module is read by the card reader within the geographic range corresponding to the current position information, each of the operating parameters of the NFC module is adjusted within the preset parameter value range; under the condition that the number of times of reading the NFC card by the card reader is greater than the first set threshold of 15, a first operating parameter with the number of adjustment is less than the second set threshold of 3 is determined in all of the operating parameters of the NFC module; the first operating parameter is set as the static parameter.

A determination manner of the first preset value includes, but is not limited to, a step described below.

Under the condition that the first operating parameter is set as the static parameter, the parameter value, which has the largest number of times of reading and corresponds to the first operating parameter, is set as the first preset value.

The number of the static parameter is one or more.

Under the condition that the number of the static parameter is multiple, the first preset value is a set of parameter values corresponding to the multiple static parameters.

2) When the NFC card is read by the card reader within the geographic range corresponding to the current position information, dynamic parameters in all of the operating parameters of the NFC module are set as multiple second preset values corresponding to the current position information in turn, where the multiple second preset values are ordered according to a preset sequence.

In an embodiment, the operation in which when the NFC card is read by the card reader within the geographic range corresponding to the current position information, the dynamic parameters in all of the operating parameters of the NFC module are set as the multiple second preset values corresponding to the current position information in turn includes operations described below.

When the NFC card is read by the card reader, current time and multiple second preset values corresponding to the current position information are acquired.

Third preset values corresponding to the current time is determined within a range of the multiple second preset values according to a mapping relation between a preset time interval and the multiple second preset values.

The dynamic parameters in all of the operating parameters of the NFC module are set as the third preset values in turn, where the third preset values are ordered according to a sequence of the multiple second preset values.

In some embodiments of the present disclosure, the geographic range corresponding to the current position information is limited, which may be a geographic range set by a user, a default geographic range when the mobile terminal is at a factory, a geographic range acquired through a limited number of experiments, or a geographic range acquired through a limited number of computer simulations.

A determination manner of the dynamic parameters in all of the operating parameters of the NFC module includes, but is not limited to, steps described below.

When the NFC card is read by the card reader, each of the operating parameters of the NFC module is adjusted within the preset parameter value range.

Under the condition that the number of times of reading the NFC card by the card reader is greater than the first set threshold, second operating parameters with the number of times of adjustment greater than or equal to the second set threshold are determined in all of the operating parameters of the NFC module.

The second operating parameters are set as the dynamic parameters.

A determination manner of the second preset values includes, but is not limited to, operations described below.

Under the condition that the second operating parameters are set as the dynamic parameters, a parameter value corresponding to a second operating parameter is set as one of the second preset values in response to reading the NFC card by the card reader each time.

All the second preset values are ordered in a descending sequence according to the number of times of setting each of the multiple second preset values.

The number of the dynamic parameter is one or more.

Under the condition that the number of the dynamic parameter is multiple, the second preset values are a set of parameter values corresponding to the multiple dynamic parameters.

In an embodiment, the operation in which the dynamic parameters in all of the operating parameters of the NFC module are set as the multiple second preset values corresponding to the current position information in turn includes operations described below.

Under the condition that a shutdown instruction is received, a dynamic parameter is set as a fourth preset value, where the fourth preset value is a first preset value in the order of all the second preset values.

According to the mobile terminal described in the seventh embodiment of the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

In an eighth embodiment of the present disclosure, a computer-readable storage medium is provided.

The computer storage medium may be a RAM, a flash memory, a ROM, an erasable programmable read-only memory (EPROM), an electrically erasable programmable read-only memory (EEPROM), a register, a hard disk, a mobile hard disk, a compact disc read-only memory (CD-ROM), or any other form of storage media known in the art.

The computer-readable storage medium stores one or more programs, and the one or more programs is able to be executed by one or more processors to implement part or all of the steps in any one of the first embodiment to the fifth embodiment of the present disclosure.

The computer-readable storage medium in the eighth embodiment of the present disclosure stores one or more programs, and the one or more programs is able to be executed by one or more processors. The automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

It should be noted that as used herein, the term "comprising", "including" or any other variants thereof is intended to encompass a non-exclusive inclusion, so that a process, method, article or apparatus including a series of elements not only includes the expressly listed elements but also includes other elements that are not expressly listed or are inherent to such a process, method, article or apparatus. In the absence of more restrictions, the elements defined by the statement "including a . . . " do not exclude the presence of additional identical elements in the process, method, article or apparatus that includes the elements.

The serial numbers of the above-mentioned embodiments of the present disclosure are merely for description, and do not indicate superiority and inferiority of the embodiments.

From the description of the above implementation, it is clear to those skilled in the art that the methods in the above embodiments may be implemented by software plus a necessary general-purpose hardware platform, or may of course be implemented by hardware. However, in many cases, the former is a preferred implementation mode. Based on this understanding, the technical schemes of the present disclosure substantially, or the part contributing to the related art, may be embodied in the form of a software product. The computer software product is stored in a storage medium (such as a ROM/RAM, a magnetic disk or an optical disc) and includes several instructions for enabling a terminal (which may be a mobile phone, a computer, a server, an air conditioner, a network device or the like) to execute the methods described in each embodiment of the present disclosure.

INDUSTRIAL APPLICABILITY

The present disclosure is applied to the technical field of communications. According to the technical schemes provided by the present disclosure, the automatic learning can be performed according to the habit of the user in using the NFC card, the operating parameters of the NFC module in the mobile terminal are optimally configured, the configuration precision and configuration speed of the operating parameters of the NFC module are greatly improved, and the user experience that the user simulates the NFC module into the NFC card is significantly improved.

What is claimed is:

1. A near field communication (NFC) configuration method, applied to a mobile terminal, comprising:
   in a case where a preset NFC module is configured as an NFC card, acquiring current position information of the mobile terminal, and setting a static parameter in all of operating parameters of the NFC module as a first preset value corresponding to the current position information; and
   in a case where the NFC card is read by a card reader within a geographic range corresponding to the current position information, setting dynamic parameters in all of the operating parameters of the NFC module as a plurality of second preset values corresponding to the current position information in turn, wherein the plurality of second preset values is ordered according to a preset sequence.

2. The method of claim 1, wherein a determination manner of the static parameter comprises:
   in a case where the NFC card is read by the card reader, adjusting each of the operating parameters of the NFC module within a preset parameter value range;
   in a case where a number of times of reading the NFC card by the card reader is greater than a first set threshold, determining a first operating parameter with a number of times of adjustment less than a second set threshold in all of the operating parameters of the NFC module; and
   setting the first operating parameter as the static parameter.

3. The method of claim 2, wherein a determination manner of the first preset value comprises:
   in a case where the first operating parameter is set as the static parameter, setting a parameter value, which has the largest number of times of reading and corresponds to the first operating parameter, as the first preset value.

4. The method of claim 3, wherein a determination manner of the dynamic parameters comprises:
   in a case where the NFC card is read by the card reader, adjusting each of the operating parameters of the NFC module within a preset parameter value range;
   in a case where a number of times of reading the NFC card by the card reader is greater than a first set threshold, determining second operating parameters with a number of times of adjustment greater than or equal to a second set threshold in all of the operating parameters of the NFC module; and
   setting the second operating parameters as the dynamic parameters.

5. The method of claim 2, wherein a determination manner of the dynamic parameters comprises:
   in a case where the NFC card is read by the card reader, adjusting each of the operating parameters of the NFC module within a preset parameter value range;
   in a case where a number of times of reading the NFC card by the card reader is greater than a first set threshold, determining second operating parameters with a number of times of adjustment greater than or equal to a second set threshold in all of the operating parameters of the NFC module; and
   setting the second operating parameters as the dynamic parameters.

6. The method of claim 1, wherein in the case where the NFC card is read by the card reader within the geographic range corresponding to the current position information, setting the dynamic parameters in all of the operating parameters of the NFC module as the plurality of second preset values corresponding to the current position information in turn comprises:
   in a case where the NFC card is read by the card reader, acquiring current time and the plurality of second preset values corresponding to the current position information;

determining third preset values corresponding to the current time within a range of the plurality of second preset values according to a mapping relation between a preset time interval and the plurality of second preset values; and setting the dynamic parameters in all of the operating parameters of the NFC module as the third preset values in turn;

wherein the third preset values are ordered according to a sequence of the plurality of second preset values.

7. The method of claim 6, wherein a determination manner of the dynamic parameters comprises:

in a case where the NFC card is read by the card reader, adjusting each of the operating parameters of the NFC module within a preset parameter value range;

in a case where a number of times of reading the NFC card by the card reader is greater than a first set threshold, determining second operating parameters with a number of times of adjustment greater than or equal to a second set threshold in all of the operating parameters of the NFC module; and setting the second operating parameters as the dynamic parameters.

8. The method of claim 1, wherein a determination manner of the dynamic parameters comprises:

in a case where the NFC card is read by the card reader, adjusting each of the operating parameters of the NFC module within a preset parameter value range;

in a case where a number of times of reading the NFC card by the card reader is greater than a first set threshold, determining second operating parameters with a number of times of adjustment greater than or equal to a second set threshold in all of the operating parameters of the NFC module; and setting the second operating parameters as the dynamic parameters.

9. The method of claim 8, wherein a determination manner of the second preset values comprises:

in a case where the second operating parameters are set as the dynamic parameters, setting a parameter value corresponding to a second operating parameter as one of the second preset values in response to reading the NFC card by the card reader each time;

ordering all the second preset values in a descending sequence according to a number of times of setting each of the second preset values.

10. The method of claim 9, wherein setting the dynamic parameters in all of the operating parameters of the NFC module as the plurality of second preset values corresponding to the current position information in turn comprises:

in a case where a shutdown instruction is received, setting a dynamic parameter as a fourth preset value;

wherein the fourth preset value is a first preset value in the order of all the second preset values.

11. A computer-readable storage medium, storing at least one program, wherein the at least one program is able to be executed by at least one processor to implement steps of the NFC configuration method of claim 1.

12. A mobile terminal, comprising a processor, a memory and a near field communication (NFC) module, wherein, the processor is configured to execute an NFC configuration program stored in the memory to implement operations of:

in a case where a preset NFC module is configured as an NFC card, acquiring current position information of the mobile terminal, and setting a static parameter in all of operating parameters of the NFC module as a first preset value corresponding to the current position information; and in a case where the NFC card is read by a card reader within a geographic range corresponding to the current position information, setting dynamic parameters in all of the operating parameters of the NFC module as a plurality of second preset values corresponding to the current position information in turn, wherein the plurality of second preset values is ordered according to a preset sequence.

13. The mobile terminal of claim 12, wherein a determination manner of the static parameter comprises:

in a case where the NFC card is read by the card reader, adjusting each of the operating parameters of the NFC module within a preset parameter value range;

in a case where a number of times of reading the NFC card by the card reader is greater than a first set threshold, determining a first operating parameter with a number of times of adjustment less than a second set threshold in all of the operating parameters of the NFC module; and setting the first operating parameter as the static parameter.

14. The mobile terminal of claim 13, wherein a determination manner of the first preset value comprises:

in a case where the first operating parameter is set as the static parameter, setting a parameter value, which has the largest number of times of reading and corresponds to the first operating parameter as the first preset value.

15. The mobile terminal of claim 13, wherein a determination manner of the dynamic parameters comprises:

in a case where the NFC card is read by the card reader, adjusting each of the operating parameters of the NFC module within a preset parameter value range;

in a case where a number of times of reading the NFC card by the card reader is greater than a first set threshold, determining second operating parameters with a number of times of adjustment greater than or equal to a second set threshold in all of the operating parameters of the NFC module; and setting the second operating parameters as the dynamic parameters.

16. The mobile terminal of claim 14, wherein a determination manner of the dynamic parameters comprises:

in a case where the NFC card is read by the card reader, adjusting each of the operating parameters of the NFC module within a preset parameter value range;

in a case where a number of times of reading the NFC card by the card reader is greater than a first set threshold, determining second operating parameters with a number of times of adjustment greater than or equal to a second set threshold in all of the operating parameters of the NFC module; and setting the second operating parameters as the dynamic parameters.

17. The mobile terminal of claim 12, wherein in the case where the NFC card is read by the card reader within the geographic range corresponding to the current position information, setting the dynamic parameters in all of the operating parameters of the NFC module as the plurality of second preset values corresponding to the current position information in turn comprises:

in a case where the NFC card is read by the card reader, acquiring current time and the plurality of second preset values corresponding to the current position information;

determining third preset values corresponding to the current time within a range of the plurality of second preset values according to a mapping relation between a preset time interval and the plurality of second preset values; and setting the dynamic parameters in all of the operating parameters of the NFC module as the third preset values in turn;

wherein the third preset values are ordered according to a sequence of the plurality of second preset values.

18. The mobile terminal of claim 12, wherein a determination manner of the dynamic parameters comprises:

in a case where the NFC card is read by the card reader, adjusting each of the operating parameters of the NFC module within a preset parameter value range;

in a case where a number of times of reading the NFC card by the card reader is greater than a first set threshold, determining second operating parameters with a number of times of adjustment greater than or equal to a second set threshold in all of the operating parameters of the NFC module; and setting the second operating parameters as the dynamic parameters.

19. The mobile terminal of claim 18, wherein a determination manner of the second preset values comprises:

in a case where the second operating parameters are set as the dynamic parameters, setting a parameter value corresponding to a second operating parameter as one of the second preset values in response to reading the NFC card by the card reader each time;

ordering all the second preset values in a descending sequence according to a number of times of setting each of the second preset values.

20. The mobile terminal of claim 19, wherein setting the dynamic parameters in all of the operating parameters of the NFC module as the plurality of second preset values corresponding to the current position information in turn comprises:

in a case where a shutdown instruction is received, setting a dynamic parameter as a fourth preset value;

wherein the fourth preset value is a first preset value in the order of all the second preset values.

* * * * *